(12) United States Patent  (10) Patent No.: US 8,192,086 B1
Marussich  (45) Date of Patent: Jun. 5, 2012

(54) AIR BEARING

(75) Inventor: Walter Marussich, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 319 days.

(21) Appl. No.: 12/500,427

(22) Filed: Jul. 9, 2009

(51) Int. Cl.
*F16C 32/06* (2006.01)

(52) U.S. Cl. ........................................ 384/100; 384/115

(58) Field of Classification Search ................. 384/100, 384/115, 118
See application file for complete search history.

(56) References Cited

U.S. PATENT DOCUMENTS

| | | | | |
|---|---|---|---|---|
| 3,305,282 | A * | 2/1967 | Arneson | 384/115 |
| 4,671,676 | A * | 6/1987 | Chen et al. | 384/100 |
| 4,710,035 | A * | 12/1987 | Vaughn | 384/115 |
| 5,240,332 | A * | 8/1993 | Onishi et al. | 384/100 |
| 6,338,574 | B1 * | 1/2002 | Shimizu et al. | 384/115 |

* cited by examiner

*Primary Examiner* — Thomas R Hannon
(74) *Attorney, Agent, or Firm* — John Ryznic

(57) ABSTRACT

An air bearing with a rotor and a static land forming a clearance gap, the rotor including a compressible fluid supply channel to supply fluid to the bearing, and the rotor including a bearing inner race rotatably secured to the rotor, the inner race having an outer surface with a plurality of pockets opening outward and connected to a high pressure reservoir on the inner surface of the inner race through a plurality of radial extending supply channels that function as centrifugal pumps when the inner race is rotating to increase the bearing fluid pressure within the air bearing and increase the bearing stiffness. The inner race pockets extend around the full annular surface.

9 Claims, 1 Drawing Sheet

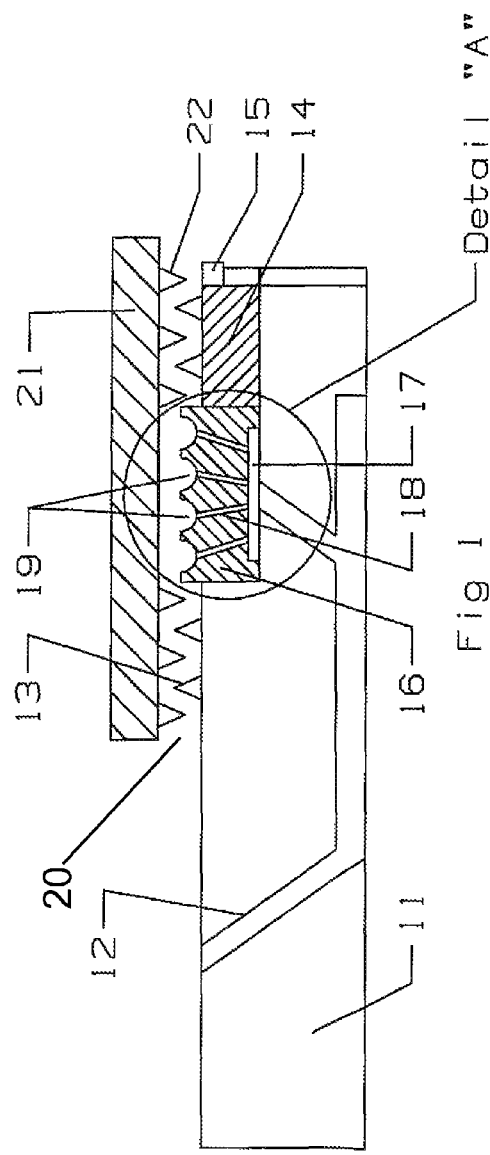

AIR BEARING

FEDERAL RESEARCH STATEMENT

None.

CROSS-REFERENCE TO RELATED APPLICATIONS

None.

BACKGROUND OF THE INVENTION

1. Field of the Invention

The present invention relates generally to an air bearing, and more specifically to a dynamic air bearing with corrugated surfaces on the rotating journal.

2. Description of the Related Art Including Information Disclosed Under 37 CFR 1.97 and 1.98

Air or ideal gas bearings are used to rotatably support a rotor shaft in which a fluid cushion is used to support the rotating part. Fluid bearings are non-contact bearings that produce less friction that roller bearings and can be operated at very high rotational speeds. The air bearing is not favored for dynamic engine applications due to low bearing stiffness that may result in undesired contact between the rotor and the static parts. Various prior art air bearings include a corrugated structure in the static lands and separate this surface from the rotating journals with a cylindrical rub surface.

BRIEF SUMMARY OF THE INVENTION

It is an object of the present invention to provide for an air bearing with a relatively high bearing stiffness compared to the cited prior art references.

It is another object of the present invention to provide for an air bearing with a surface that adds pumping capability to increase the hydrodynamic squeeze pressure.

It is another object of the present invention to provide for an air bearing with a corrugated surface on the rotor section of the air bearing.

These objectives and more are achieved in the air bearing of the present invention in which a section of the rotating part of the air bearing includes corrugations that form a surface that produces a pumping motion to increase the hydrodynamic squeeze pressure of the air bearing and therefore increases the stiffness of the air bearing. The corrugations are concave dimples like on a golf ball that open outward and face an inner surface of the static part of the air bearing. Sundry seals are positioned on both sides of the dimples of the air bearing to form a seal for pressurized air delivered to the air bearing through a supply channel formed in the rotor shaft.

BRIEF DESCRIPTION OF THE SEVERAL VIEWS OF THE DRAWINGS

FIG. 1 shows a cross section view of the air bearing with the rotating corrugations of the present invention.

FIG. 2 shows a cross section front view of a section of the bearing inner race with the hemispherical pockets of FIG. 1.

FIG. 3 shows a surface view of the hemispherical pockets on the bearing inner race of FIG. 1.

DETAILED DESCRIPTION OF THE INVENTION

The present invention is an air bearing with corrugations formed on the rotating surface of the air bearing and function to increase the hydrodynamic pressure of the air bearing and thus increase the air bearing stiffness so that the air bearing can be used in a dynamic engine application. Air or vapor or another compressible fluid can be used for the air bearing.

FIG. 1 shows the air bearing assembly and includes a rotor 11, an air or vapor supply channel 12, a sundry seal arrangement 21 on a static land 21 with another seal arrangement 13 on the rotor 11, a retaining ring and seals 14, an anti-rotation lock 15, a bearing inner race 16, a high pressure reservoir 17 formed on an inner surface of the bearing inner race, and a plurality of supply channels 18 formed in the inner race 16 that open into a plurality of face hemispherical pockets 19 opening on an outer surface of the inner race 16. A clearance gap 20 is formed between the rotor 11 and the land 21 of around 0.001 inches (0.0254 mm).

FIG. 2 shows a cross section view along the axis of the rotor 11 of the bearing inner race 16 with the arrangement of the pockets 19 opening outward. FIG. 3 shows a section of the outer surface of the inner race 16 with the arrangement of the pockets 19 that form pumping action to increase the hydrodynamic squeeze pressure of the air bearing.

In operation, high pressure air (or vapor) or another compressed fluid is supplied through the channels 12 and into the reservoir 17, which is then routed through the plurality of supply channels or orifices 18 and into the pockets 19. The supply channels or orifices 18 function as centrifugal pumps for the high pressure air passing through. The air or vapor in the damper cavity is at a higher pressure than in the supply due to the centrifugal pumping action. As the rotor eccentricity (displacement over the clearance) increases, a pressure gradient forms due to the squeeze effect of the proximal surface and aided by an irregular surface. Also, the air or vapor is displaced around the rotor lower pressure regions, and the air or vapor trapped in the pockets 19 cannot be displaced but will increase the local pressure due to volumetric compression. If the medium used is a saturated vapor, the hydrostatic pressure—due to a large eccentricity—in the pockets 19 may introduce a phase change from vapor to a saturated liquid that will increase the bearing stiffness to asymptotic infinity.

I claim the following:

1. An air bearing comprising:
   a rotor;
   a compressible fluid supply channel formed in the rotor to deliver a compressed fluid used for the air bearing;
   a bearing inner race rotatably secured to the rotor;
   the bearing inner race having an outer surface with a plurality of corrugations opening outward;
   a static land outward from the inner race and forming a gap for the air bearing;
   a plurality of supply channels formed within the inner race and connecting the compressible fluid supply channel in the rotor to the plurality of corrugations; and,
   rotation of the rotor causes a rotation of the inner race which produces a centrifugal pumping action on the compressible fluid passing through the plurality of supply channels.

2. The air bearing of claim 1, and further comprising:
   the plurality of corrugations are concave shaped pockets separated from each other.

3. The air bearing of claim 2, and further comprising:
   each pocket is connected to a supply channel formed within the inner race.

4. The air bearing of claim 1, and further comprising:
   the bearing inner race includes a high pressure reservoir formed on an inner surface and connected to the compressible fluid supply channel and the plurality of supply channels formed within the inner race.

5. The air bearing of claim 3, and further comprising:
the bearing inner race is a full annular inner race;
the corrugations extend around the full annular outer surface of the inner race; and,
the high pressure reservoir is a full annular reservoir extending around an inner surface of the bearing inner race.

6. The air bearing of claim 1, and further comprising:
the bearing inner race is a full annular inner race; and,
the corrugations extend around the full annular outer surface of the inner race.

7. The air bearing of claim 1, and further comprising:
a sundry seal extending from the static land and the rotor and formed on both sides of the bearing inner race.

8. The air bearing of claim 1, and further comprising:
the gap formed between the rotor and the static land is around 0.001 inches.

9. The air bearing of claim 1, and further comprising:
the supply channels are radial extending supply channels.

* * * * *